US012146342B2

(12) United States Patent
Lovett

(10) Patent No.: US 12,146,342 B2
(45) Date of Patent: Nov. 19, 2024

(54) DETECTION AND CORRECTION OF INSUFFICIENT LOCKING BEHAVIOR OF AN ELECTRONIC LOCKSET

(71) Applicant: ASSA ABLOY Americas Residential Inc., New Haven, CT (US)

(72) Inventor: Matthew Denton Lovett, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 8 days.

(21) Appl. No.: 17/715,332

(22) Filed: Apr. 7, 2022

(65) Prior Publication Data

US 2022/0325557 A1 Oct. 13, 2022

Related U.S. Application Data

(60) Provisional application No. 63/172,221, filed on Apr. 8, 2021.

(51) Int. Cl.
*E05B 47/00* (2006.01)
*E05B 63/00* (2006.01)

(52) U.S. Cl.
CPC ...... *E05B 47/0001* (2013.01); *E05B 63/0017* (2013.01); *E05B 2047/0069* (2013.01)

(58) Field of Classification Search
CPC ............. E05B 47/0001; E05B 63/0017; E05B 2047/0069
See application file for complete search history.

(56) References Cited

U.S. PATENT DOCUMENTS

| | | | | |
|---|---|---|---|---|
| 9,758,990 | B2 * | 9/2017 | Beck | E05B 17/22 |
| 2011/0259059 | A1 * | 10/2011 | Wu | E05B 63/0017 70/91 |
| 2012/0073338 | A1 * | 3/2012 | Mohla | E05B 47/0012 70/124 |
| 2013/0192317 | A1 * | 8/2013 | McKibben | G05B 19/0405 292/144 |
| 2014/0047878 | A1 * | 2/2014 | Zheng | E05B 55/06 70/357 |

(Continued)

FOREIGN PATENT DOCUMENTS

| | | | |
|---|---|---|---|
| JP | 2012-162856 | A | 8/2012 |
| KR | 10-2008-0100614 | A | 11/2008 |

OTHER PUBLICATIONS

International Search Report and Written Opinion for PCT/US2022/023767 mailed Jul. 19, 2022.

*Primary Examiner* — Mark A Williams
(74) *Attorney, Agent, or Firm* — Merchant & Gould, P.C.

(57) ABSTRACT

Methods and systems for detecting and correcting insufficient locking behavior, using an electronic lockset. One aspect is a method of deadlatching an electronic lockset, the method comprising detecting motion of a deadbolt from an unlocked position toward a locked position, determining a position of the deadbolt after the motion ceases via a sensor of the electronic lockset, determining, based on the position, whether the deadbolt has moved to the locked position, wherein in the locked position the deadbolt is placed in a deadlatched state, and transmitting an actuation command to the electronic lockset to move the deadbolt into the locked position.

19 Claims, 8 Drawing Sheets

(56) References Cited

U.S. PATENT DOCUMENTS

| | | | | |
|---|---|---|---|---|
| 2014/0292001 | A1* | 10/2014 | Nunez | E05B 55/005<br>292/164 |
| 2017/0226774 | A1* | 8/2017 | Goldenson | G01B 7/30 |
| 2018/0080250 | A1* | 3/2018 | Martin | E05B 15/10 |
| 2018/0155959 | A1* | 6/2018 | Hartung | E05B 17/10 |
| 2019/0178805 | A1 | 6/2019 | Su et al. | |
| 2019/0383060 | A1* | 12/2019 | Lien | E05B 47/0692 |
| 2020/0080343 | A1* | 3/2020 | Uyeda | E05B 47/0012 |
| 2020/0123808 | A1* | 4/2020 | Lovejoy | E05B 17/10 |
| 2020/0208436 | A1* | 7/2020 | Colligan | G08B 5/36 |
| 2020/0265662 | A1* | 8/2020 | Maiga | G07C 9/00174 |

* cited by examiner

DETECTION AND CORRECTION OF INSUFFICIENT LOCKING BEHAVIOR OF AN ELECTRONIC LOCKSET

CROSS-REFERENCE TO RELATED APPLICATIONS

The present application claims priority to U.S. Provisional Patent Application No. 63/172,221, filed on Apr. 8, 2021, the disclosure of which is hereby incorporated by reference in its entirety.

TECHNICAL FIELD

The present disclosure relates generally to electronic locksets. In particular the present disclosure relates to an electronic lockset with features for the detection and correction of insufficient locking behavior.

BACKGROUND

Deadbolt locks are used to secure access points from unauthorized entry. A conventional deadbolt extends into a recess in the adjacent access point. Deadbolt locks may be opened by an interior switch, key, or other valid credential, which allows an authorized user to enter through the access point. A typical deadbolt latch has a feature called deadlatching. Deadlatching occurs when the deadbolt cannot be retracted in a non-credentialed way.

Methods of credentialing a lock are becoming more numerous. Electronic locksets for residential premises, e.g., at residential exterior doors, are becoming increasingly popular for user convenience. For example, certain types of wireless electronic locksets may await a signal from a mobile device of a user to actuate an unlocking operation at a door. Other types of devices may allow actuation (e.g., unlocking) of the lockset if an authorized mobile device is within proximity of the lockset. Generally, lockset actuation is performed in response to a deliberate presentation of a credential or signal from a user (e.g., entry of a code or otherwise signaling from a mobile device an intent to lock or unlock a door). When electronically actuated, deadlatching may often be ensured by the electronic lockset. However, in some instances, a dual mode lockset which accommodates both manual locking (e.g., via a turnpiece on an interior side of the door or via a keyed lock core) and electronic locking may be provided. In such instances, it is often the case that, where a lockset is manually moved between locked and unlocked positions, there is little if any monitoring by the electronic circuitry of the lockset regarding the locked or unlocked position of the lockset.

SUMMARY

In summary, the present disclosure relates to an arrangement and methodology for detecting when a user has manually operated a lock but failed to fully lock or unlock an electronic lock of a door. The electronic lock is then instructed to finish moving a bolt to fully lock or unlock the door. In particular, a sensor monitors the starting and ending position of the deadbolt and determines a user's intended action based on the movement of the deadbolt. For example, if a user attempts to lock the door but does not manipulate the locking mechanism enough to deadlatch the system, the system will detect the error and electronically complete the action. In some embodiments, a similar procedure can also be implemented to ensure the door moves to an unlocked state.

One aspect is an electronic lockset comprising a manual turnpiece, a deadbolt movable between an unlocked position and a locked position by the manual turnpiece, a processing unit electrically connected to a motor, a sensor, and a memory, the motor actuatable by the processing unit and selectively connectable to the deadbolt to move the deadbolt between the unlocked position and the locked position, the sensor configured to track a location of the deadbolt between the unlocked position and the locked position, and the memory storing instructions which, when executed by the processing unit, cause the electronic lockset to detect, using signals received from the sensor, motion of the deadbolt from the unlocked position toward the locked position, determine whether the deadbolt is in the locked position after the motion of the deadbolt ceases, when the deadbolt is determined to not be in the locked position, activate the motor to move the deadbolt to the locked position.

Another aspect is a method of deadlatching an electronic lockset, the method comprising detecting motion of a deadbolt from an unlocked position toward a locked position, determining a position of the deadbolt after the motion ceases via a sensor of the electronic lockset, determining, based on the position, whether the deadbolt has moved to the locked position, wherein in the locked position the deadbolt is placed in a deadlatched state, and transmitting an actuation command to the electronic lockset to move the deadbolt into the locked position.

Yet another aspect is an electronic lockset assembly comprising an electronic lockset installed on a door within a door frame, the electronic lockset including an interior portion and an exterior portion, the interior portion having a manual turnpiece, wherein the electronic lockset includes a deadbolt movable between an extended position where the deadbolt protrudes into a side of the door frame and a retracted position where the deadbolt is retracted within the door in response to movement of the manual turnpiece, a processing unit, a motor actuable by the processing unit to move the deadbolt between a non-deadlatched state and a deadlatched state, and a sensor configured to detect a position of at least one of the deadbolt or the manual turnpiece, a memory storing instructions which, when executed by the processing unit, cause the electronic lockset assembly to receive, from the sensor, a motion signal, determine, from the motion signal, if the deadbolt is moved partially from the non-deadlatched position toward the deadlatched position, and when it is determined that the deadbolt has moved partially toward the deadlatched position but is not in the deadlatched position, actuating the motor to move the deadbolt to the deadlatched position.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
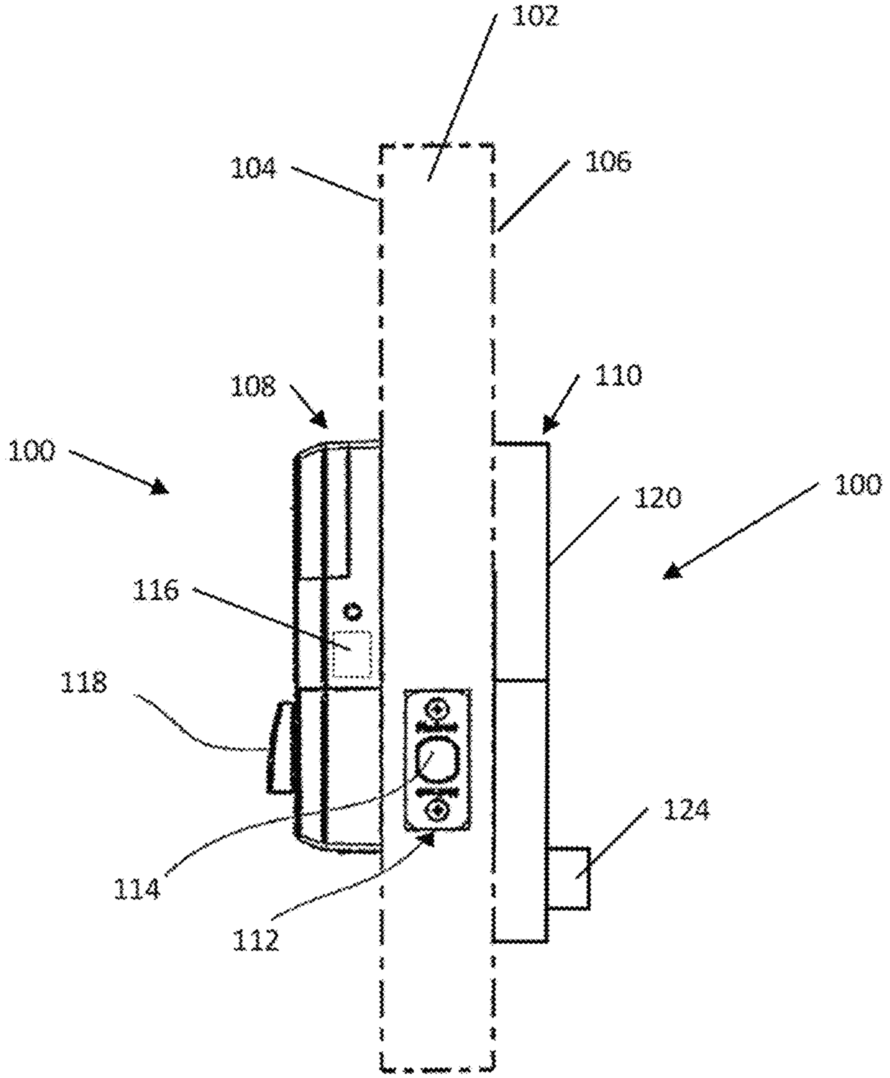
FIG. 1 illustrates a side perspective view of a portion of the electronic lock.

As briefly described above, the present disclosure relates to an electronic lockset configured to detect manual actuation of a deadbolt, determine that the deadbolt has not been fully deadlatched, and activating a motor to complete the movement of the deadbolt to deadlatch the lock and/or place the deadbolt in a fully extended position. In some embodiments, the electronic lock can also complete an unlocking mechanism when movement of the deadbolt indicates an incomplete unlocking action. A sensor monitors the starting and ending position of the deadbolt and determines a user's intended action. If the user attempts to lock the door but does not manipulate the locking mechanism enough to deadlatch, then the system will detect the error and electronically complete the action.

To prevent a deadbolt lock from being manipulated to open without credentials, it is typical to include a deadlatching arrangement that prevents a fully extended deadbolt from being retracted by an external force. These arrangements require a mechanism to sufficiently extend the deadbolt to achieve a deadlatched position. If the deadbolt is not sufficiently extended, the deadbolt could be compromised by an external force. One embodiment of the present disclosure is directed to electronically deadlatching the lock when the deadbolt is determined to be moving towards an extended, locked position but has not been extended to sufficiently to reach the deadlatched position.

For example, a user may turn a deadbolt sufficiently to block the door from opening but not enough to deadlatch the lockset. In this instance if a user pulls on the door it will appear as if the door is locked. However, because the lock has not been deadlatched, the deadbolt could be retracted in an unauthorized way (i.e., by force instead of by credential). The lock competes the transition to the deadlatched state by detecting movement of the lock indicating that the user has attempted to activate the lock, detecting that the lock is not deadlatched, and electronically completing the transition of the deadbolt to the deadlatched position. In some embodiments, a similar procedure can also be implemented to ensure the door moves to an unlocked state.

The term "lock" or "lockset" is broadly intended to include any type of lock, including but not limited to deadbolts, knob locks, lever handle locks, mortise locks and slide locks, whether mechanical, electrical or electro-mechanical locks. The locking points may have various mounting configurations and/or locations, including but not limited to: mortised within the doorframe, mounted externally to the doorframe or support structure, and/or affixed directly to the door. Although this disclosure describes these features as implemented on a deadbolt for purposes of example, these features are applicable to any type of lockset, including but not limited to deadbolts, knobset locks, handleset locks, etc.

Any combination of absolute and relative position sensors are used to track the deadbolt position. If the deadbolt moves non-electrically from a starting position that corresponds to a fully extended deadbolt position or fully retracted deadbolt position but does not fully reach the opposite lock state, a motor is actuated to drive the deadbolt to the intended lock state. "Lock state" refers to an unlocked position or a locked, deadlatched position. The sensors can track the deadbolt position from a variety of locations. The deadbolt position may, in example implementations, correspond to a position of a manual turnpiece or other latch position for a lock. Accordingly, the term "deadbolt" is generally used herein, but may be implemented using a latch, deadbolt, or other latching mechanism. A motion sensor can track the position of a deadbolt and/or turnpiece to determine motion of the deadbolt. A turnpiece can include a protrusion from the lockset that can be manipulated by a user. A turnpiece can include a recess which allows manipulation by a user when a credential, such as a key, is inserted. A person of ordinary skill of the art would recognize that a motion sensor may be attached to a variety of moving pieces in the lockset including pieces where the movement corresponds with movement of the latching mechanism.

The motorized deadlatching action could have a variable implementation. In one embodiment, the processor may wait a fixed amount of time in the undefined state before instructing the motor to move the latch to appropriate lock state. For example, the processor may wait thirty seconds after a user has partially moved the lock to another state before sending an actuation instruction to the motor to complete the transition to another lock state. In another embodiment, the processor may instruct the motor to move the latch as soon as it has detected that the user has stopped moving the lockset and the deadbolt has not fully transitioned to the appropriate state.

Figure 2:
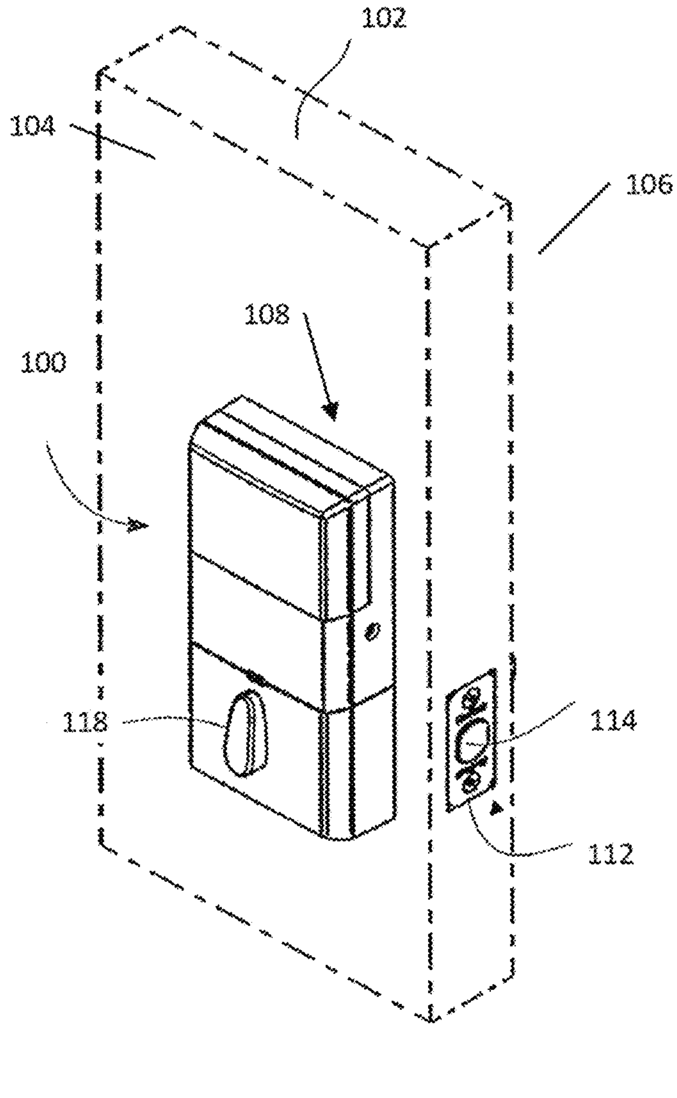
FIG. 2 illustrates a rear perspective view of a portion of the electronic lock of FIG. 1.
Figure 3:
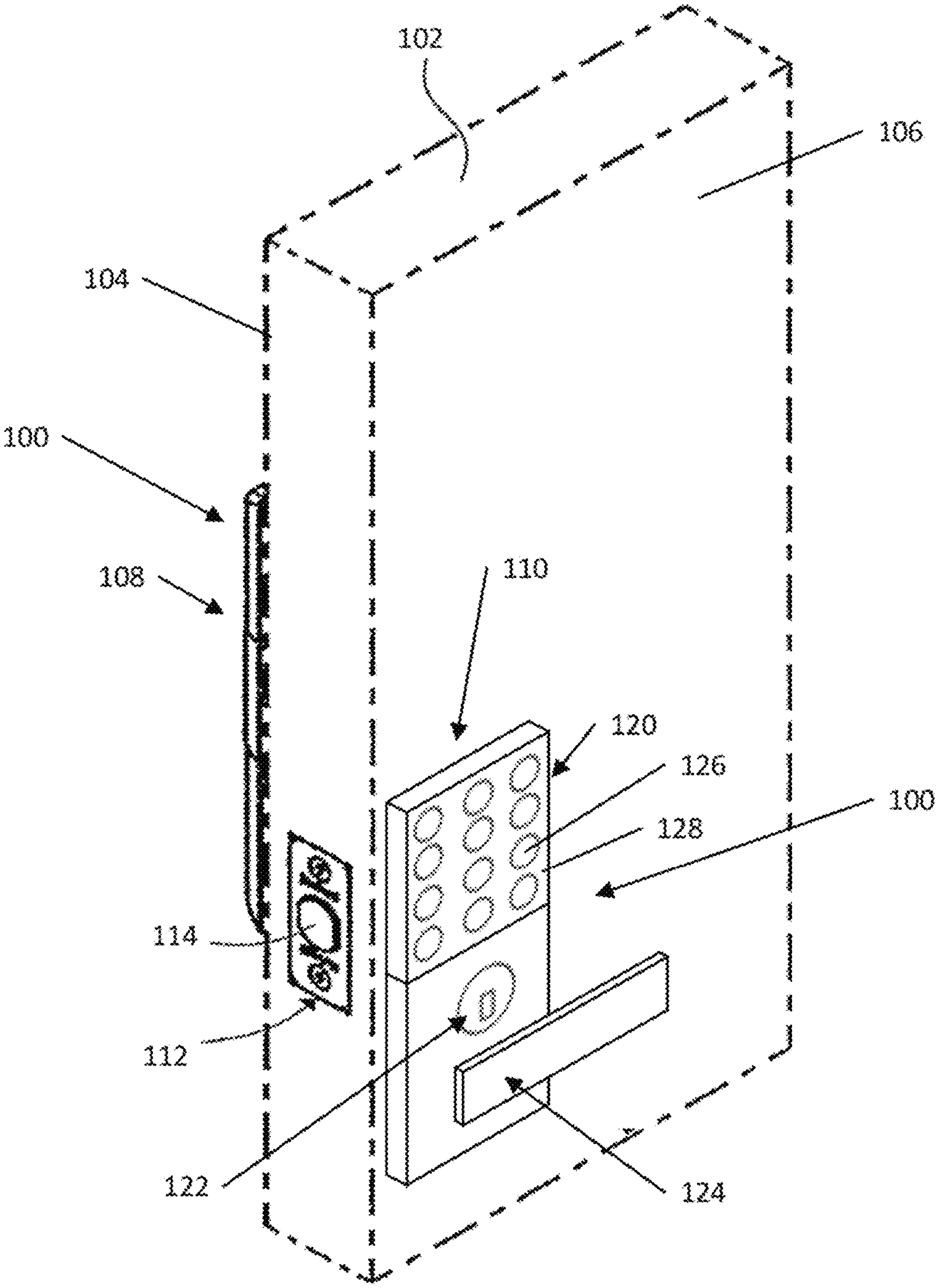
FIG. 3 illustrates a front perspective view of a portion of the electronic lock of FIG. 1.

FIGS. 1-3 illustrate an example electronic lock 100 mounted to a door 102. The electronic lock 100 represents an example environment and device within which the features of the present disclosure can be implemented. In the example shown, the door has an interior side 104 and an exterior side 106. The electronic lock 100 includes an interior assembly 108, an exterior assembly 110, and a latch assembly 112. The latch assembly 112 is shown to include a bolt 114 (also referred to herein as a deadbolt) that is movable between an extended position (locked) and a retracted position (unlocked). Specifically, the bolt 114 is configured to slide longitudinally between a locked state and an unlocked state when actuated by either a manual turnpiece or an electronic motor. When the bolt 114 is retracted, the door 102 is in an unlocked state. When the bolt 114 is extended, the bolt 114 protrudes from the door 102 into a door jamb (not shown) to place the door in a locked state.

In some examples, the interior assembly 108 is mounted to the interior side 104 of the door 102, and the exterior assembly 110 is mounted to the exterior side 106 of the door 102. The latch assembly 112 is typically at least partially mounted in a bore formed in the door 102. With an exterior entry door, for example, the exterior assembly 110 may be mounted outside a building, while the interior assembly 108 may be mounted inside a building. With an interior door, the exterior assembly 110 may be mounted inside a building, but outside a room secured by the electronic lock 100, and the interior assembly 108 may be mounted inside the secured room. The electronic lock 100 is applicable to both interior and exterior doors.

In some embodiments, the interior assembly 108 can include a processing unit 116 (shown schematically in FIG. 1 and FIG. 6) containing electronic circuitry for the electronic lock 100. In some examples, the interior assembly 108 includes a manual turnpiece 118 that can be used on the interior side 104 of door 102 to move the bolt 114 between the extended and retracted positions. FIG. 2 illustrates a view of the interior assembly 108 when the bolt 114 is in the retracted position.

Referring to FIG. 3, the exterior assembly 110 can include a keypad 120 for receiving a user input and/or a keyway 122 for receiving a key (not shown). The exterior side 106 of the door 102 can also include a handle 124. In some examples, the exterior assembly 110 includes the keypad 120 and not the keyway 122. In some examples, the exterior assembly 110 includes the keyway 122 and not the keypad 120. In some examples, the exterior assembly 110 includes both the keyway 122 and the keypad 120. When a valid key is inserted into the keyway 122, the valid key can move the bolt 114 between the extended and retracted positions. Alternatively, when a user inputs a valid code into the keypad 120, the bolt 114 is electronically activated to move between the extended and retracted positions.

In some examples, the exterior assembly 110 is electrically connected to the interior assembly 108. In some embodiments, the keypad 120 is electrically connected to the interior assembly 108, specifically to the processing unit 116, by, for example, an electrical cable (not shown) that passes through the door 102. When the user inputs a valid code via the keypad 120 that is recognized by the processing unit 116, an electrical motor is activated to retract the bolt 114 of the latch assembly 112, thus permitting door 102 to be opened from a closed position. Still further, an electrical connection between the exterior assembly 110 and the interior assembly 108 allows the processing unit 116 to communicate with other features included in the exterior assembly 110, as noted below.

The keypad 120 can be any of a variety of different types of keypads. The keypad 120 can be one of a numeric keypad, an alpha keypad, and/or an alphanumeric keypad. In some embodiments, the keypad 120 can have a plurality of characters 126 displayed thereon. For example, the keypad 120 can include a plurality of buttons that can be mechanically actuated by the user (e.g., physically pressed). In some embodiments, each of the buttons includes a character 126. In some examples, the keypad 120 includes a touch interface 128, such as a touch screen or a touch keypad, for receiving a user input. The touch interface 128 is configured to detect a user's "press of a button" by contact without the need for pressure or mechanical actuation.

Figure 4A:
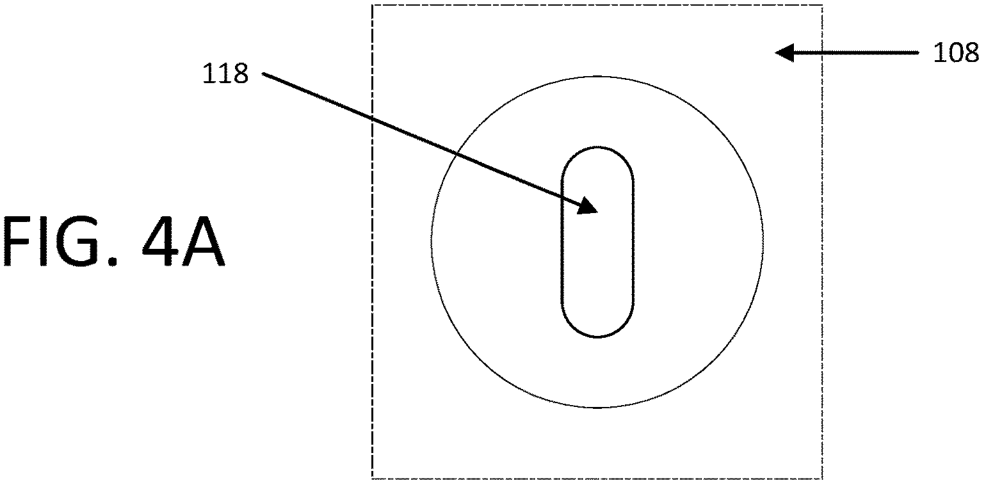
FIG. 4A illustrates the electronic lockset with a retracted deadbolt in an unlocked and non-deadlatched position.
Figure 4B:
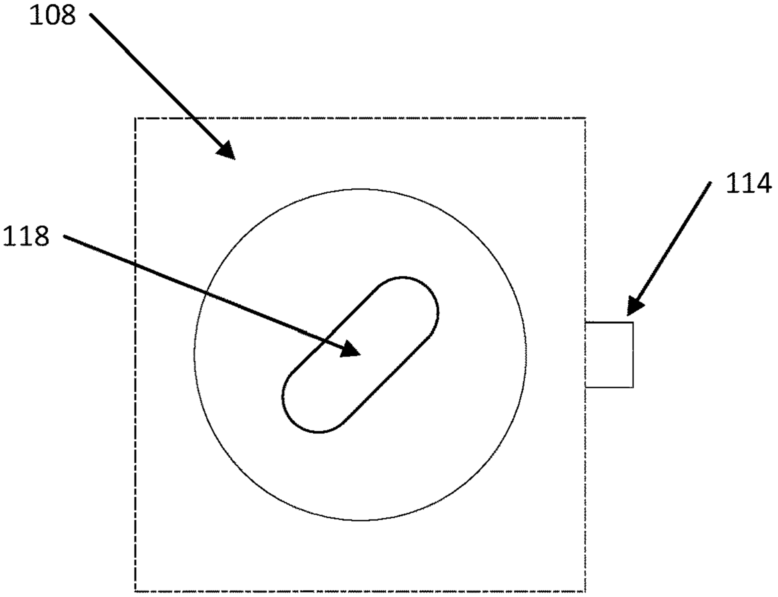
FIG. 4B illustrates the electronic lockset with an extended deadbolt in a non-deadlatched position.
Figure 4C:
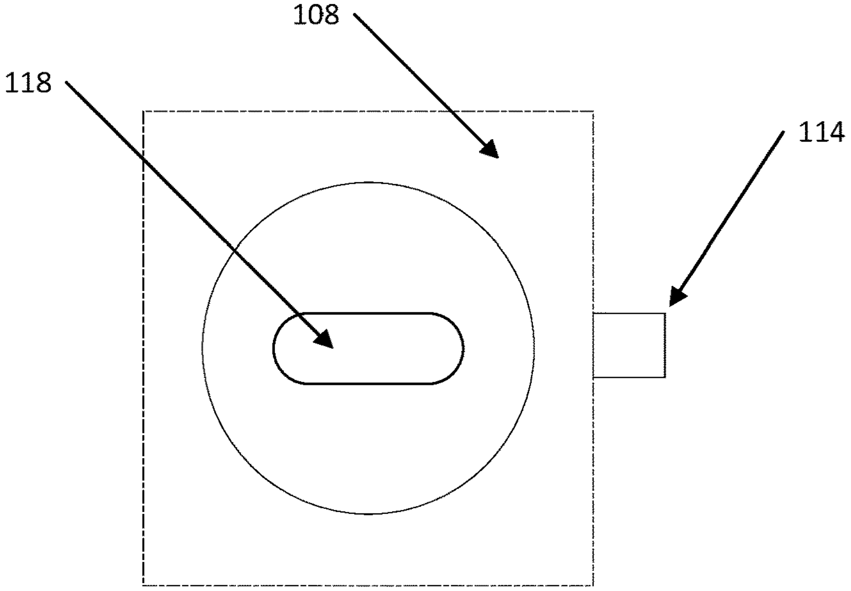
FIG. 4C illustrates the electronic lockset with an extended deadbolt and in a deadlatched position.

FIGS. 4A through 4C show simplified schematic diagrams depicting an interior assembly 108 having a manual turnpiece 118 and a bolt 114. Together, FIGS. 4A through 4C show the movement of the bolt 114 as it is extended from a retracted unlocked position into a fully latched or locked position.

FIG. 4A illustrates the manual turnpiece 118 in a vertical orientation and the bolt 114 in a retracted position. This view shows the interior assembly 108 in an unlocked position. A door could be open and shut with the lock in this position.

FIG. 4B illustrates the manual turnpiece 118 in a partially rotated position (approximately 45 degrees clockwise). The bolt 114 is partially extended from the lock and door. This position would prevent a door from being opened. However, the bolt 114 is not completely extended and deadlatched. Therefore, the lock could be forced open without proper credentials.

FIG. 4C illustrates the manual turnpiece 118 in a completely rotated position approximately 90 degrees clockwise from the unlocked position. The manual turnpiece 118 is in a horizontal orientation. The bolt 114 is fully extended and deadlatched. This position would both prevent a door from being opened and prevent the lock from being forced open without proper credentials.

While particular rotational positions are shown in FIGS. 4A-4C, it is recognized that a variety of other rotational ranges for the manual turnpiece 118 may be used as well. Additionally, while in FIG. 4B a partially rotated position is illustrated that corresponds with a partially extended bolt 114, in some instances, the bolt 114 may be more or less extended than is depicted in FIG. 4B. This may depend, for example, on relative positions of the edge of the door and a strike plate to be engaged by the bolt 114.

Figure 5A:
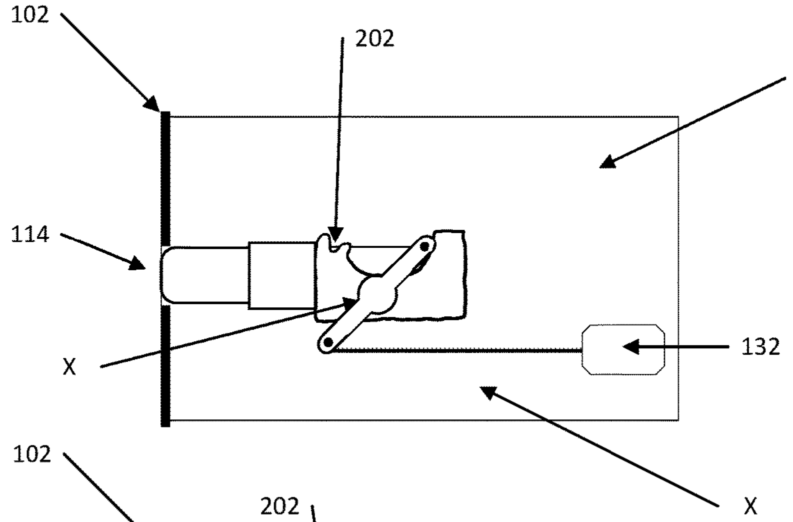
FIG. 5A illustrates the electronic lockset with a retracted deadbolt in an unlocked and non-deadlatched position.
Figure 5B:
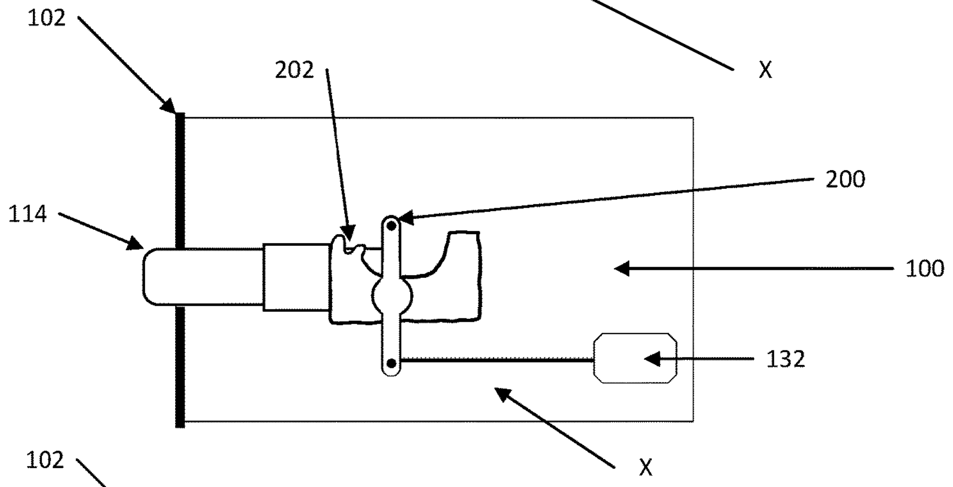
FIG. 5B illustrates the electronic lockset with an extended deadbolt in a non-deadlatched position.
Figure 5C:
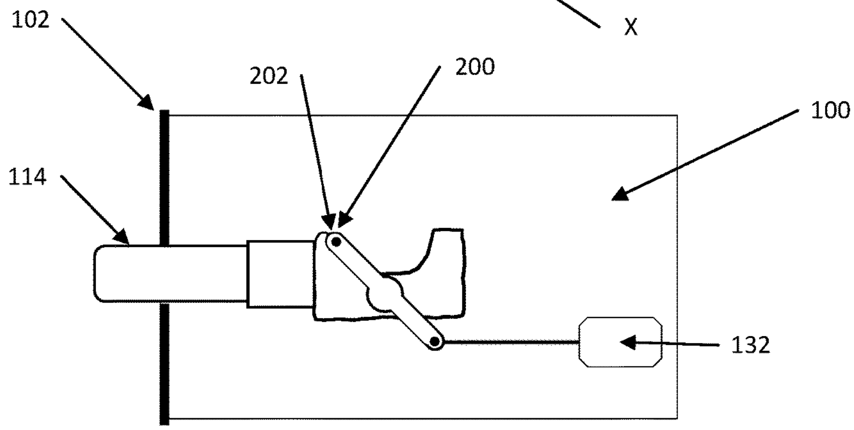
FIG. 5C illustrates the electronic lockset with an extended deadbolt and in a deadlatched position.

FIGS. 5A through 5C show simplified schematic diagrams depicting a view of a latch mechanism 150 including a bolt that are usable in the electronic lock 100 of the present disclosure. In the examples shown, the latch mechanism 150 is positioned in a cutaway view of the door 102. FIGS. 5A-5C correspond to the positions of FIGS. 4A-4C, respectively.

FIG. 5A depicts the electronic lock 100 in an unlocked position. This view corresponds with the diagram of FIG. 4A. The bolt 114 is retracted into the door 102. In this example, the latch mechanism 150 is shown as connected to a motor 132 (which is not present in the side-view, but is shown schematically for illustrative purposes). The motor 132 may be configured to selectively engage with the latch mechanism 150, rotating a deadbolt drive mechanism. The deadbolt drive mechanism may also be permanently mated with the manual turnpiece 118, such that (1) the turnpiece causes rotation of the deadbolt drive mechanism around an axis (seen at "X" in FIG. 5A), and (2) and the motor 132 may be selectively engaged to the deadbolt drive mechanism for movement of the bolt 114.

In some instances, the motor 132 is made to the selectively couple drive mechanism via a clutch (not shown). The clutch may be configured as seen in U.S. Patent Publication No. 2020/0080343, entitled "Locking Assembly With Spring Mechanism", the disclosure of which is hereby incorporated by reference in its entirety.

FIG. 5B depicts the electronic lock 100 in a partially locked position. This view corresponds with the diagram of FIG. 4B. The bolt 114 is partially extended out of the door 102. If the door 102 is closed, the door 102 would not be able to be opened. However, the electronic lock 100 is not completely deadlatched. This may be the case, for example, if a manual turnpiece, e.g., manual turnpiece 118, is partially rotated from an interior side of the door. This may occur when a user does not realize that he/she has not completely rotated the turnpiece. As noted above, the effective distance of partial extension of the bolt 114 may differ across door installations, due to, e.g., a particular geometry of the installation, including the distance to and strength of installation of a strike plate positioned opposed to the bolt 114 within a door frame. In accordance with some aspects of the present disclosure, the position shown in FIG. 5B represents a position between the positions seen in FIGS. 5A and 5C that may cause partial engagement between the bolt 114 and an opposed strike plate, but which may not fully engage such that a manual force against the door may overcome any retention capability.

FIG. 5C depicts the electronic lock 100 in a completely locked and deadlatched position. This view corresponds with the diagram of FIG. 4C. In this arrangement, the bolt 114 is fully extended. The latch mechanism 150 may be rotated such that an arm of that mechanism is seated within a notch 152 of the assembly including the bolt 114, thereby limiting rotation of the manual turnpiece 118 and supporting/maintaining the bolt 114 and latch mechanism 150 in the locked/deadlatched position.

It is noted that in each of FIGS. 5A-5C, a motor 132 is selectively engaged with the latch mechanism 150, such that the motor 132 may be used as an alternative to a manual turnpiece 118 to move the bolt 114 between locked and unlocked positions. In example embodiments, as discussed below, a position of the manual turnpiece 118 and/or bolt 114 may be detected by an electrical circuit of the electronic lock. Alternatively, a movement of the bolt 114 and/or manual turnpiece 118 toward a deadlatched position may be detected as begun, but not completed. In such arrangements, and as discussed in further detail below, the electrical circuit may cause engagement of the motor 132 with the latch mechanism 150 to adjust a position of the bolt 114 (and associated manual turnpiece 118) to a fully locked or fully unlocked position, to avoid ambiguity with respect to whether or not the door is in an adequately locked position. For example, in particular embodiments, and as discussed below, the electrical circuit included within an electronic lock 100 may cause the motor 132 to move from the partially locked position seen in FIGS. 4B and 5B toward the locked position of FIGS. 4C and 5C upon detection of the partially locked position (e.g., due to detection of the position of the bolt 114). Details regarding operation of the electronic lock 100, and in particular the circuitry of the electronic lock, are provided below in connection with FIGS. 6-7.

Figure 6:
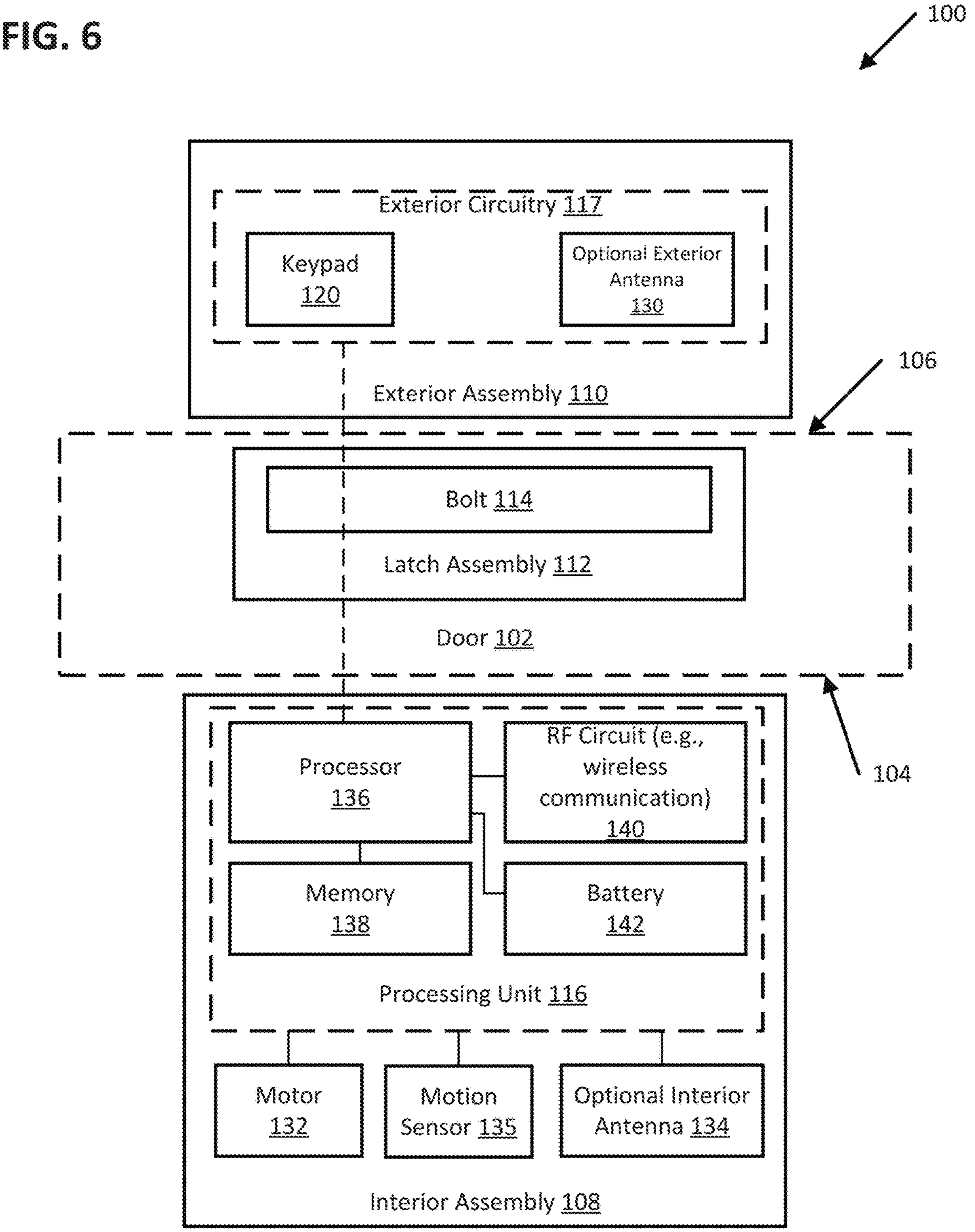
FIG. 6 illustrates a schematic representation of the electronic lock of FIG. 1.

FIG. 6 is a schematic representation of the electronic lock 100 mounted to the door 102. The interior assembly 108, the exterior assembly 110, and the latch assembly 112 (which includes the latch mechanism 150 and notch 152) are shown.

The exterior assembly 110 is shown to include the keypad 120 and an optional exterior antenna 130 usable for communication with a remote device. The keypad 120 and optional exterior antenna 130 are electrically connectable to a processing unit 116, and in particular to processor 137, via exterior circuitry 117.

The exterior antenna 130 is capable of being used in conjunction with an interior antenna 134, such that the processing unit 116 can determine where a mobile device is located. Only a mobile device determined to be located on the exterior of the door is able to actuate (unlock or lock) the door. This prevents unauthorized users from being located exterior to the door 102 of the electronic lock and taking advantage of an authorized mobile device that may be located on the interior of the door, even though that authorized mobile device is not being used to actuate the door. Such a feature is not required, but can add additional security.

As described above, the interior assembly 108 includes the processing unit 116. The interior assembly 108 can also include the motor 132 and an optional interior antenna 134.

The processing unit 116 is operable to execute a plurality of software instructions (i.e., firmware) that, when executed by the processing unit 116, cause the electronic lock 100 to implement the methods and otherwise operate and have functionality as described herein. The processing unit 116 may comprise a device commonly referred to as a processor, e.g., a central processing unit (CPU), digital signal processor (DSP), or other similar device and may be embodied as a standalone unit or as a device shared with components of the electronic lock 100. The processing unit 116 may include memory communicatively interfaced to the processor, for storing the software instructions. Alternatively, or the electronic lock 100 may further comprise a separate memory device for storing the software instructions that is electrically connected to the processing unit 116 for the bi-directional communication of the instructions, data, and signals therebetween.

As shown, the processing unit 116 includes a processor 136 communicatively connected to memory 138, a radio frequency (RF) circuit 140, and a battery 142. The processing unit 116 is located within the interior assembly 108 and is capable of operating the electronic lock 100, e.g., by actuating the motor 132 to actuate the bolt 114.

In some examples, the processor 136 can process signals received from a variety of devices to determine whether the electronic lock 100 should be actuated. Such processing can be based on a set of preprogramed instructions (i.e., firmware) stored in the memory 138.

In some examples, the processing unit 116 is configured to capture a keypad input event from a user and store the keypad input event in the memory 138. In other examples, the processor 136 receives a signal from the exterior antenna 130, the interior antenna 134, or a motion sensor 135 (e.g., a vibration sensor, gyroscope, accelerometer, motion/position sensor, or combination thereof) and can validate received signals in order to actuate the electronic lock 100. In a particular embodiment, the processor 136 will receive a signal at the RF circuit 140 via a wireless communication protocol from a mobile device 200, which uses a protocol different from that communication protocol to receive a value from the electronic lock 100 for authentication.

In example embodiments, the motion sensor 135 can be used in conjunction with the processing unit 116 to determine when the user has manipulated the manual turnpiece 118 but failed to complete the transition of the electronic lock 100 to another state (between unlocked and locked). Using such a motion sensor 135 (e.g., an accelerometer, gyroscope, or other position or motion sensor) with these capabilities embedded inside a door can assist in determining additional types of events (e.g., a door opening or door closing event, a lock actuation or lock position event, or a knock event based on vibration of the door). In some cases, motion events can cause the electronic lock 100 to perform certain processing, e.g., to communicatively connect to or transmit data to a mobile device 200 in proximity to the electronic lock 100.

The memory 138 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

In some examples, the processing unit 116 can include the radio frequency (RF) circuit 140. The RF circuit 140 is capable of providing at least one wireless communication protocol. In some examples, the processing unit 116 can communicate with a remote device via the RF circuit 140. In some examples, the processing unit 116 can communicate with one or both of the mobile device 200 and a key server 300 via the RF circuit 140. The RF circuit 140 can include one or more wireless communication interfaces, e.g., Bluetooth, Wi-Fi (IEEE 802.11x protocols), or any other wireless communication interface capable of bidirectional wireless communication. In example embodiments, the RF circuit 140 can include a Bluetooth Low Energy (BLE) interface.

In some examples, the electronic lock 100 can wirelessly communicate with external devices through a desired wireless communications protocol. In some examples, an external device can wirelessly control the operation of the electronic lock 100, such as operation of the bolt 114. The electronic lock 100 can utilize wireless protocols including, but not limited to, the IEEE 802.11 standard (Wi-Fi), the IEEE 802.15.4 standard (Zigbee and Z-wave), the IEEE 802.15.1 standard (Bluetooth®), a cellular network, a wireless local area network, near-field communication protocol, and/or other network protocols. In some examples, the electronic lock 100 can wirelessly communicate with networked and/or distributed computing systems, such as may be present in a cloud-computing environment. Such communication may be facilitated, for example, by the RF circuit 140.

The interior assembly 108 also includes the battery 142 to power the electronic lock 100. In one example, the battery 142 may be a standard single-use (disposable) battery. Alternatively, the battery 142 may be rechargeable. In still further embodiments, the interior assembly 108 can lack the battery 142 entirely, but instead be electrically connected to an external power source.

The interior assembly 108 also includes the motor 132 that is capable of actuating the bolt 114. In use, the motor 132 receives an actuation command from the processing unit 116, which causes the motor 132 to actuate the bolt 114 from the locked position to the unlocked position or from the unlocked position to the locked position. In some examples, the motor 132 actuates the bolt 114 to complete a transition between lock states.

In some examples, the motor 132 may actuate the bolt 114 which movement corresponds to movement in the latch. In some examples, the motor 132 receives a specified lock or unlock command, where the motor 132 only actuates the bolt 114 if the bolt 114 is in the correct position. For example, if the door 102 is locked and the motor 132 receives a lock command, then no action is taken. If the door 102 is locked and the motor 132 receives an unlock command, then the motor 132 actuates the latch and the bolt 114 to unlock the door 102. Generally, the motor 132 may be selectively engageable with the bolt 114 to move the bolt 114 between locked and unlocked positions based on, for example, entry of an appropriate code and/or communication between a mobile device and the processor 136, e.g., via any of a variety of wireless interfaces made available via RF circuit 140.

Referring to FIGS. 1-6 generally, in example embodiments, the electronic lock 100 may be used on both interior and exterior doors. Described below are non-limiting examples of a wireless electronic lockset. It should be noted that the electronic lock 100 may be used on other types of doors, such as a garage door, a pet door, or other types of doors that require an authentication process to unlock (or lock) the door.

In some embodiments, the electronic lock 100 is made of mixed metals and plastic, with engineered cavities to contain electronics and antennas. For example, in some embodiments, the electronic lock 100 utilizes an exterior antenna 130 near the exterior face of the lockset, designed inside the metal body of the lockset itself. The metal body can be engineered to meet strict physical security requirements and also allow an embedded front-facing antenna to propagate RF energy efficiently.

Figure 7:
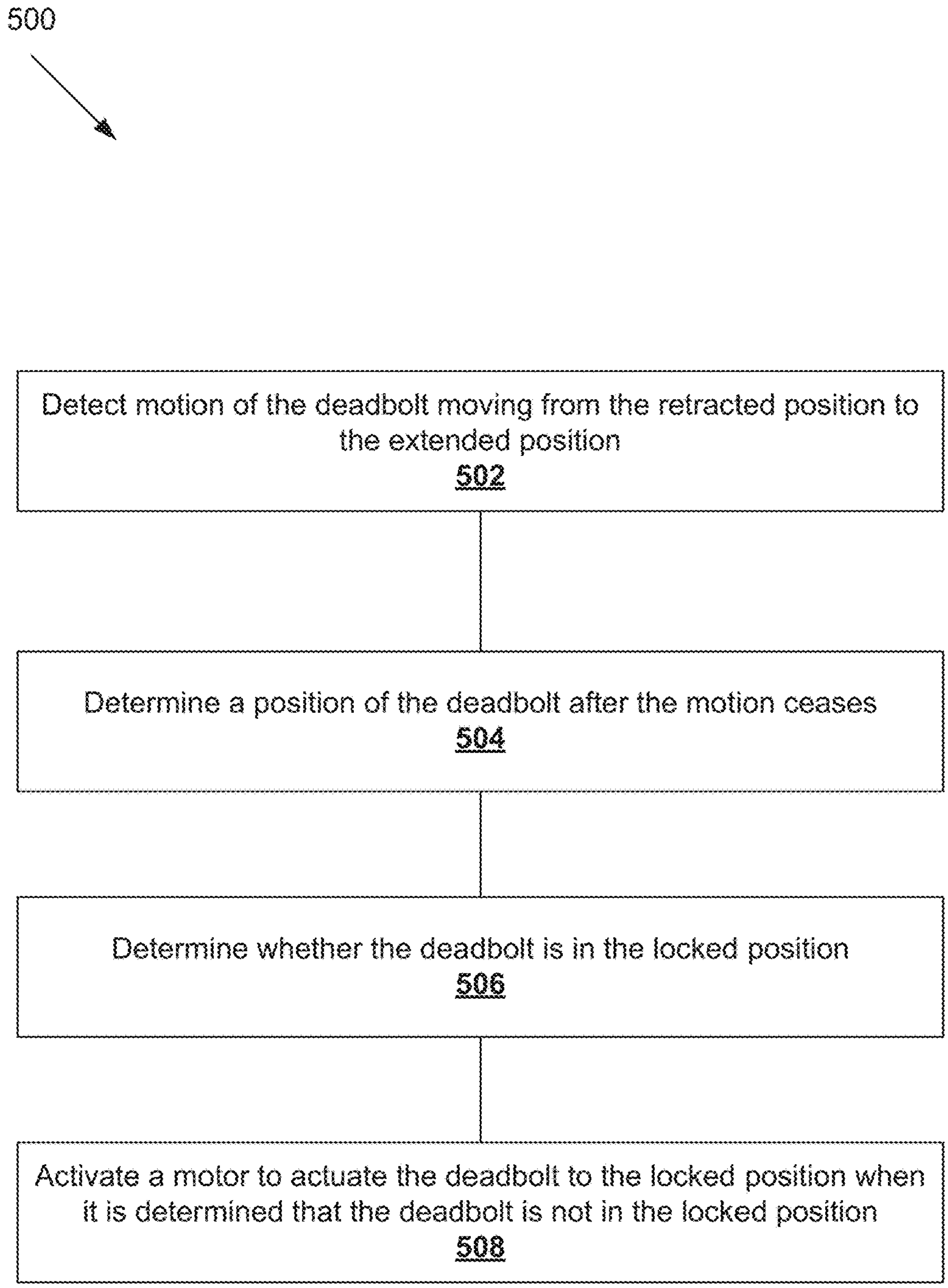
FIG. 7 is a flowchart of a method for the correction and detection of incomplete locking of the electronic lockset.

FIG. 7 is a flow diagram of an example method 500 of deadlatching an electronic lockset. The electronic lockset may be, for example, the electronic locks 100 of FIGS. 1-6. However, any lockset having a bolt, a deadlatch, and a motor could operate to execute the method 500.

At operation 502, motion of a deadbolt moving from a retracted position (e.g., an unlocked position) to an extended position (e.g., a locked position) is detected. Generally, this would be detected as a user is manually rotating a turnpiece (e.g., manual turnpiece 118) to lock a door. In some embodiments, this is detected when a user manually rotating a key in a keyway. In further embodiments, motion is sense when a motor actuates the deadbolt. A motion sensor tracks an initial position of the deadbolt (e.g., bolt 114) and movement from the initial position to a final position.

At operation 504, a position of the deadbolt after movement ceased is determined. In some embodiments, the position is taken after a predetermined period of time. For example, the position may be taken after 1 second, 3 seconds, 30 seconds etc. In typical embodiments, the position is determined between after 5 to 10 seconds after the deadbolt movement ceased. In some embodiments, the motion sensor detects the position of the deadbolt. In some embodiments, another component of the lock is tracked during its movement to determine how far the bolt of the lock is extended, such as a manual turnpiece. For example, an extent of rotation of the manual turnpiece may be detected, such as by a contact sensor that detects when complete rotation has occurred. In alternative configurations, an accelerometer may be used to detect either linear motion of the deadbolt or rotational movement of the turnpiece. Other embodiments may use alternative motion detection systems.

Operation 506 determines whether the bolt is a. locked position (fully extended position), wherein the locked position corresponds to the lock being in a deadlatched state. For example, the states illustrated in FIGS. 4C and 5C shown a lockset in a fully locked position. The positions illustrated in FIGS. 4B and 5B illustrate the lock in not fully locked position. As discussed above the position of a deadlock when no further movement of the deadbolt is detected within a predetermined amount of time, such as between 3-30 seconds, and typically within 5-10 seconds of ceasing manual movement. At operation 508, a motor is activated to actuate the deadbolt to a fully locked and therefore deadlatched state when it is determined that the deadbolt is not in the locked position at the operation 506. The motor could be the same motor used to retract the deadbolt when the electronic lock receives authorized credentials to unlock the lockset. In some embodiments, the motor is a separate motor used specifically for deadlatching the deadbolt. In the example depicted above, the same motor 132 is used, but is temporarily engaged to the deadbolt to complete the latching operation.

In some embodiments, an electronic lockset can perform a method similar to the method 500 of FIG. 7 except that the lockset is being unlocked. In some embodiments, it is determined from a motion sensor whether a bolt is moving from a locked position to an unlocked position. In such cases, the position of the bolt when movement ceases is determined. In some instances, a position sensor rather than a motion sensor may be used, with beginning and ending positions of the bolt and/or turnpiece being used to assess condition of the electronic lockset. Based on the motion and position when the bolt ceases motion, determining that the deadbolt has not fully extended to a deadlatched state. The motor is activated to actuate the deadbolt to the fully extended deadlatched state. In such an arrangement, rather than completing a locking motion intended by the user, the motor actuates the lock such that the deadbolt returns to the deadlatched state, thereby preventing the lock from being inadvertently left in a partially unlocked state by a user.

In alternative embodiments, the partial unlocking operation may result in the control circuitry causing the motor to complete movement of the lock to the unlocked state (e.g., the unlocked state shown in FIGS. 4A, 5A) thereby assisting with the user operation. In such an arrangement, the unlocking operation may be performed relatively near in time to the manual, partial unlocking operation to ensure that the user has not abandoned or changed his/her mind regarding moving the lock to the unlocked position. For example, in some embodiments, if a partially unlocked deadbolt is moved to an unlocked position by the motor 132, a control circuit causing such action would typically initiate movement within 2-5 seconds after the partial unlocking operation is detected.

Figure 8:
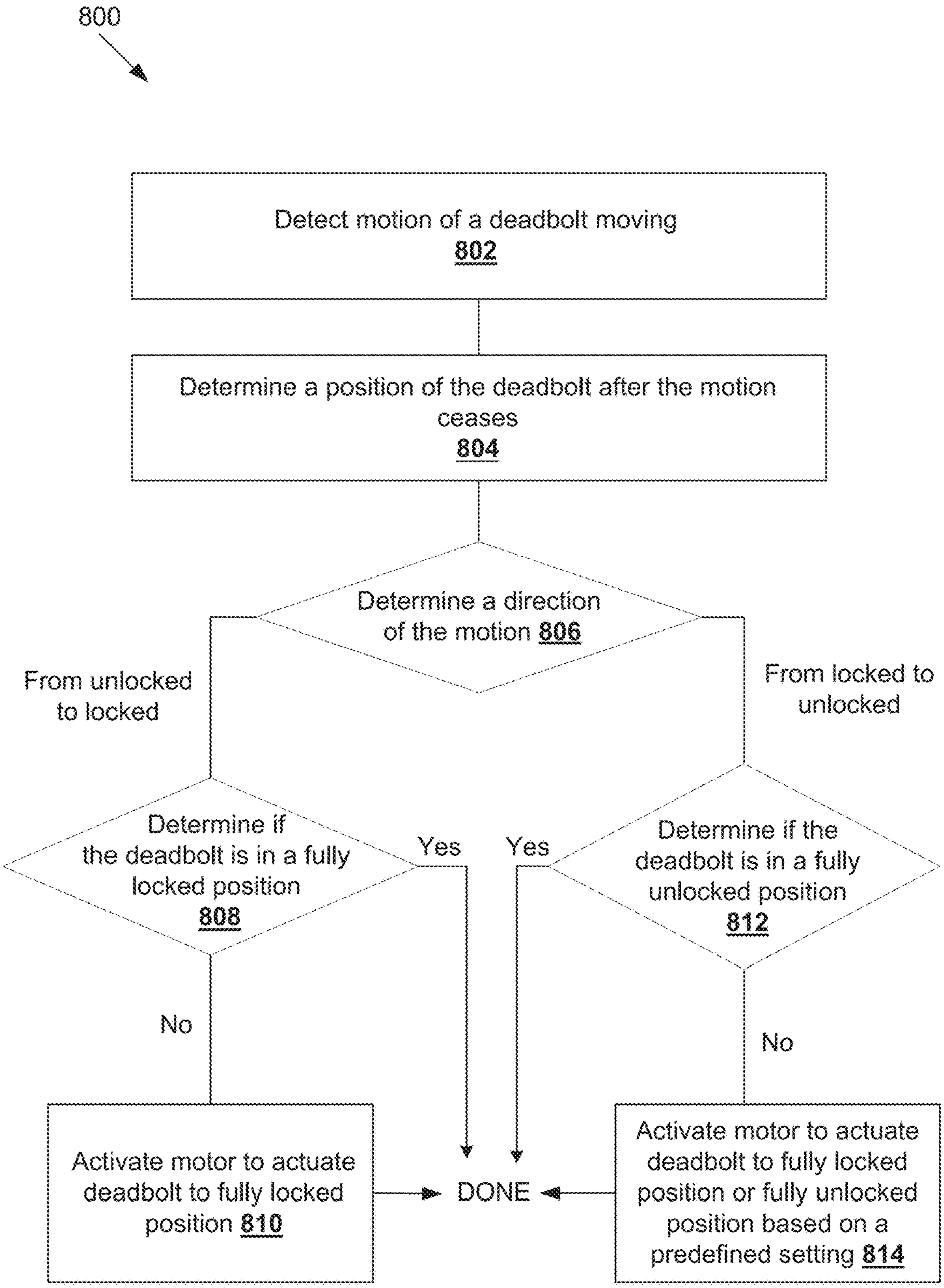
FIG. 8 is a flow diagram of an example method for the detection and correction of incomplete locking of the electronic lockset.

FIG. 8 is a flow diagram of an example method 800 for the detection and correction of incomplete deadlatching of an electronic lockset. The method 800 includes the operations 802, 804, 806, 808, 810, and 812.

The operation 802 detects motion of a deadbolt in an electronic lockset moving. In some embodiments, the motion of the deadbolt is detected using a sensor to detect movement of the deadbolt. In some embodiments, the motion of the deadbolt is determined based on detected motion of a manual turnpiece. Examples of sensors configured to track motion of a deadbolt are described herein. In some embodiments, the sensor is activated in response to a user actuation of the manual turnpiece.

The operation 804 determines a position of the deadbolt after the motion ceases. In some embodiments, the position of the deadbolt is determined after a predetermined period of time. Examples of sensors configured to track a location of a deadbolt are described herein.

The operation 806 determines a direction of the motion. The operation 806 determines if the deadbolt is moving from the unlocked position to the locked position or from the locked position to the unlocked position. In some embodiments, the direction of the motion is based on the signals received from the sensor. In other embodiments, the direction is based on the previous state the lock was in. For example, if the lockset was previously in an unlocked state and motion is detected then the lockset determines the lock is moving to the locked state.

If the operation 806 determines that the deadbolt moved from the unlocked position to the locked position, the method 800 continues to the operation 808. The operation 808 determines if the deadbolt is in a fully locked position. If the deadbolt is in a fully locked position the method 800 completes and the electronic lockset waits until further motion of the deadbolt is detected. If the deadbolt is not in the fully locked position, the method 800 continues to the operation 810 to activate a motor in the lock to actuate the deadbolt to the fully locked position, ensuring that the lock is in a deadlatched state and/or that the deadbolt is fully extended.

If the operation 806 determines that the deadbolt has moved from a locked position to an unlocked position, the method 800 continues to the operation 812. The operation 812 determines if the bolt is in a fully unlocked position. If the bolt is in a fully unlocked position, the method 800 is complete. If the bolt is not in a fully unlocked position, method 800 continues to the operation 812.

The operation 812 activates a motor to actuate a deadbolt to a fully locked position or a fully unlocked position based on a predefined setting 814. For example, a predefined setting may determine to always correct a deadbolt to the locked position. In some embodiments, the predefined setting may correct the deadbolt to the unlocked position. In some embodiments, a user can modify the setting via a connected device or an I/O device on the electronic lockset.

After the method 800 is complete and the lockset will return to a state where it waits for further motion of the deadbolt to be detected before performing the method 800 again based on the further motion.

Referring to FIGS. 1-8 overall, it is noted that the present disclosure reflects a number of advantages. For example, this provides a more secure way to ensure a deadbolt lock is deadlatched, ensuring that an external force on the deadbolt does not unlock the door.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The invention claimed is:

1. An electronic lockset comprising:

a manual turnpiece;

a deadbolt movable between an unlocked position and a locked position by the manual turnpiece;

a processing unit electrically connected to a motor, a sensor, and a memory;

the motor actuatable by the processing unit and selectively connectable to the deadbolt to move the deadbolt between the unlocked position and the locked position;

the sensor configured to track a location of the deadbolt between the unlocked position and the locked position; and the memory storing instructions which, when executed by the processing unit, cause the electronic lockset to:

detect, using signals received from the sensor, motion of the deadbolt from the unlocked position toward the locked position;

determine whether a position of the deadbolt is the locked position after the motion of the deadbolt ceases; and in response to a determination that the position of the deadbolt is not the locked position after the motion of the deadbolt ceases, activate the motor to move the deadbolt directly from the position to the locked position.

2. The electronic lockset of claim 1, wherein the locked position corresponds to the deadbolt being in a fully extended position.

3. The electronic lockset of claim 1, wherein the locked position corresponds to the deadbolt being in a deadlatched state.

4. The electronic lockset of claim 1, wherein activation of the motor occurs a predetermined amount of time after the motion of the deadbolt ceases.

5. The electronic lockset of claim 3, wherein when the deadbolt is in the deadlatched state, the electronic lockset prevents the deadbolt from retracting by an external force.

6. The electronic lockset of claim 1, wherein the sensor comprises a position sensor configured to detect a position of the deadbolt.

7. The electronic lockset in claim 1, wherein the sensor tracks movement of the deadbolt.

8. The electronic lockset of claim 1, wherein the sensor tracks movement of the manual turnpiece.

9. The electronic lockset of claim 1, wherein the sensor is activated in response to a user actuation of the manual turnpiece.

10. The electronic lockset of claim 1, wherein the instructions further cause the electronic lockset to:

detect, using the signals from the sensor, retraction motion of the deadbolt from the locked position to the unlocked position;

determine if the deadbolt is fully retracted to the unlocked position; and when it is determined that the deadbolt is not fully retracted, activate the motor to return the deadbolt to the unlocked position.

11. An electronic lockset assembly comprising:

an electronic lockset installed on a door within a door frame, the electronic lockset including an interior portion and an exterior portion, the interior portion having a manual turnpiece, wherein the electronic lockset includes:

a deadbolt movable between an extended position where the deadbolt protrudes into a side of the door frame and a retracted position where the deadbolt is retracted within the door in response to movement of the manual turnpiece;

a processing unit;

a motor actuable by the processing unit to move the deadbolt between a non-deadlatched state and a deadlatched state; and a sensor configured to detect a position of at least one of the deadbolt or the manual turnpiece;

a memory storing instructions which, when executed by the processing unit, cause the electronic lockset assembly to:

receive, from the sensor, a motion signal;

determine, from the motion signal, if the deadbolt is moved from the non-deadlatched position to a position that is not the deadlatched position; and in response to a determination that the deadbolt has moved to the position that is not the deadlatched position, actuate the motor to move the deadbolt directly from the position to the deadlatched position.

12. The electronic lockset assembly of claim 11, wherein the instructions further cause the electronic lockset assembly to:

wait a predetermined amount of time after the deadbolt is determined as stopped moving before instructing the motor to move the deadbolt to the deadlatched position.

13. The electronic lockset assembly of claim 11, wherein the non-deadlatched position includes a position where the deadbolt is in the extended position.

14. The electronic lockset assembly of claim 11, wherein the motor is selectively engageable to the deadbolt to move the deadbolt between the extended position and the retracted position.

15. The electronic lockset of claim 1, wherein the motion of the deadbolt is caused by manual actuation of the manual turnpiece.

16. The electronic lockset of claim 1, wherein to activate the motor to move the deadbolt to the locked position is performed in response to a detection of a partial manual locking motion.

17. The electronic lockset of claim 1, wherein to activate the motor to move the deadbolt to the locked position is performed in response to a detection of a partial manual unlocking motion.

18. The electronic lockset of claim 1, wherein the electronic lockset is further configured to activate the motor to move the deadbolt to the unlocked position in response to a detection of a partial manual unlocking motion.

19. The electronic lockset of claim 11, wherein the position that is not the deadlatched position is toward the deadlatched position from the non-deadlatched position.

* * * * *